(No Model.)

R. CAMPBELL.
GEARING.

No. 324,455. Patented Aug. 18, 1885.

Witnesses:
F. W. Campbell.
P. B. Harris

Inventor.
Robert Campbell

UNITED STATES PATENT OFFICE.

ROBERT CAMPBELL, OF ALLEGHENY, ASSIGNOR TO GEORGE L. PEABODY, OF PITTSBURG, PENNSYLVANIA.

GEARING.

SPECIFICATION forming part of Letters Patent No. 324,455, dated August 18, 1885.

Application filed November 24, 1884. (No model.)

*To all whom it may concern:*

Be it known that I, ROBERT CAMPBELL, a citizen of the United States, residing in Allegheny, in the county of Allegheny and State of Pennsylvania, have invented a new and useful Improvement in Gearing, of which the following is a specification.

My invention relates to gearing, in which a spindle or wheel provided with suitable bearings is served by and in connection and combination with a piston-rod, connecting-rod, or pitman.

The object of my invention is the interconversion of reciprocating and rotary motion in order to utilize momentum, while providing for effective propulsion or action. These objects I attain by the mechanism illustrated in the accompanying drawings, which form a part of this specification.

Similar letters refer to similar parts throughout the several views.

Figure 1:
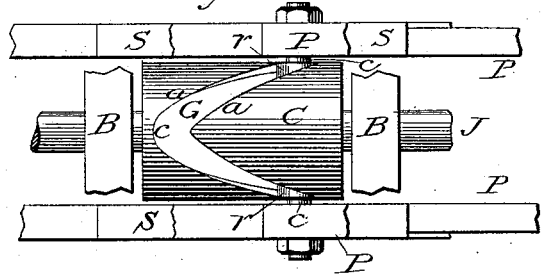

Figure 1 represents a spindle, C, operated by two piston-rods or connecting-rods, P P. S S are guides or slides retaining and directing the stroke of the piston-rods. *r r* represent anti-friction rollers affixed to the crossheads or operative ends of the piston-rods P P, to convey the current force to or from the inclines or bearings of the spindle C. The groove G of the spindle has four reverting curves, *c c c*, and eight inclines or bearings, *a a* + +. The stroke of the piston-rod is here shown as equal to the diameter of the spindle. The anti-friction rollers *r r* are shown as engaging opposite points of the spindle; but it is preferable that they should engage points preventing the encountering of the dead-points at the same instant.

Figure 2:
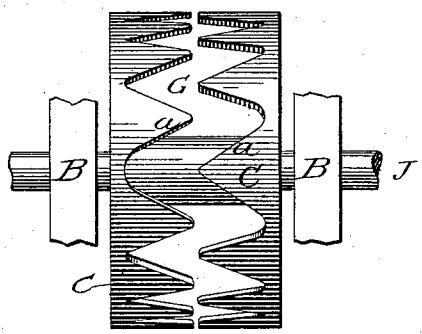

Fig. 2 represents a wheel adapted to the conditions serving the same objects attained by the spindle shown in Fig. 1. The piston-rods are not shown in this figure; but it is evident that the wheel would operate or be operated by the same mechanism.

Figure 3:
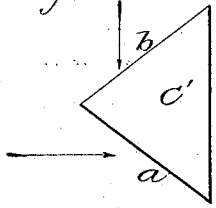

Fig. 3 shows the angles of the inclines of the spindle shown in Fig. 1 projected on a plane. The perspective of the spindle does not afford a true view of the angles. The arrow *a* shows the angle of the piston force. The arrow *b* shows the direction and angle of resistance, reaction, or momentum force. When the angle is forty-five degrees, the interconversion of the current forces are nearly equal; but it is not intended by this specification to limit the mechanism to a specific angle, but to claim a range of twenty degrees, having forty-five degrees as the intermediate angle of a range between thirty-five degrees (35°) and fifty-five degrees, (55°); or, in other words, an angle of forty-five degrees is preferred as an intermediate between an angle of fifty-five degrees and an angle of thirty-five degrees in a range of angles serving the purposes of the device herein described.

Having plainly described my invention, I desire and ask to be protected in claiming—

1. In gearing, a spindle or wheel having four or more reverting curves and eight or more inclines or bearings, substantially as set forth, and for the purposes described.

2. In gearing, the combination of one or more piston-rods or connecting-rods, furnished with one or more anti-friction rollers, with a spindle or wheel having four or more reverting curves with inclines or bearings, substantially as set forth and described, and for the purposes alleged.

ROBERT CAMPBELL.

Witnesses:
JAMES H. PORTE,
FRANK B. WOODWARD.